Nov. 4, 1969      R. R. ALFORD      3,476,512
PRESSURE CONTROL IN A CARBON BLACK REACTOR
Filed May 2, 1966

INVENTOR
R. R. ALFORD
BY Young & Quigg
ATTORNEYS

United States Patent Office  3,476,512
Patented Nov. 4, 1969

3,476,512
PRESSURE CONTROL IN A CARBON BLACK REACTOR
Roscoe R. Alford, Fritch, Tex., assignor to Phillips Petroleum Company, a corporation of Delaware
Filed May 2, 1966, Ser. No. 546,715
Int. Cl. C09c 1/50
U.S. Cl. 23—209.4                    2 Claims

ABSTRACT OF THE DISCLOSURE

A method of controlling the pressure in a reactor containing particulate matter by forming a quiescent zone open to reactor pressure but substantially free of the presence of particulate matter and adjusting the position of a valve in the product outlet line responsive to the sensed pressure to maintain the reactor pressure substantially constant. The apparatus for establishing the quiescent zone and controlling the pressure is also disclosed.

---

Figure 1:
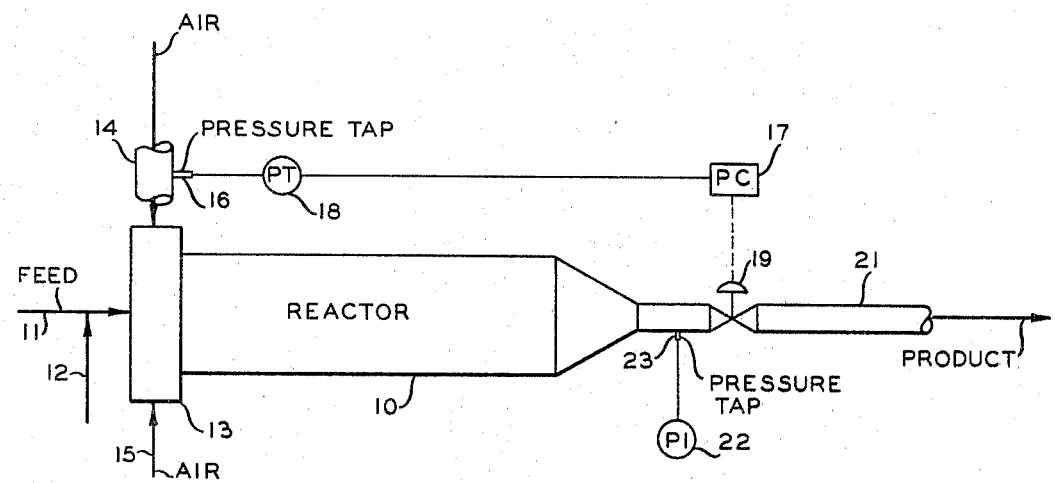

This invention relates to the control of pressure in a carbon black reactor. In one aspect the invention relates to an improved method for sensing the pressure in a carbon black reactor. In another aspect the invention relates to a pressure sensing means that is not affected by the carbon in a carbon black reactor.

The properties and quantities of carbon black produced in a furnace carbon black reactor are affected by the static pressure in the reactor. For example, the surface area of the carbon black produced can be varied over a considerable range by varying the static pressure in the reactor. Furthermore, the quantity of carbon black produced can often be increased by increasing the pressure in the reactor.

It is an object of the present invention to provide a method and means for sensing the pressure in a carbon black reactor.

It is another object to provide a method and means for controlling the pressure in a carbon black reactor so as to obtain carbon black having a predetermined property such as a specific surface area value.

It is still another object of this invention to provide a method and means for sensing the pressure in a carbon black reactor so that the carbon black in the reactor does not affect the sensing of the pressure.

Figure 2:
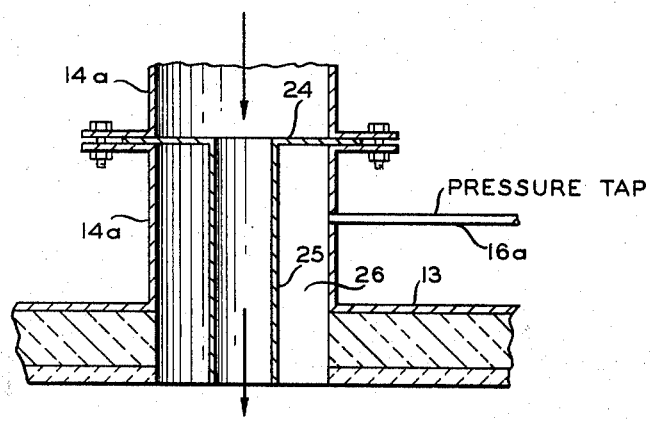

Other objects and advantages of the invention will be apparent upon study of the disclosure including the detailed description of the invention and the drawing wherein:

FIGURE 1 is a diagrammatic illustration of a carbon black reactor having the pressure sensing means of the invention incorporated therein; and FIGURE 2 is a cross-section of a preferred embodiment of the pressure sensing means applicable for use in the reactor of FIGURE 1.

I have discovered that the above objects can be attained by sensing the pressure in an air inlet conduit adjacent the reactor; preferably in a zone of minimum flow and turbulence created by positioning a section of smaller conduit in the air inlet conduit and sealing the annulus at the upstream end, with respect to the direction of air flow. This creates a substantially quiescent zone, free of carbon black, which is representative of the pressure in the reactor. The pressure sensed at this point can be utilized to control the pressure in the reactor at a level which produces carbon black having the desired properties. The correlation of pressure at the sensing point and properties of carbon black is a simple matter.

The invention has been practiced in several runs in the production of SRF and GPF blacks with pressure controlled within 0.1 inch of mercury with the desired pressure being 5.5 inches of mercury. The greatest deviation in pressure has been in the range of 5.3 to 5.8 inches of mercury with the control set at 5.5 inches of mercury.

Referring now to the drawing, a furnace carbon black reactor 10 is shown schematically in FIGURE 1. Reactant hydrocarbon is passed via conduit 11 axially into the reactor 10. The reactant feed stream is usually jacketed with a stream of air admitted via conduit 12. Air or a combustible mixture of air and fuel is introduced into the precombustion chamber 13 of the reactor 10 via conduits 14 and 15. A pressure tap 16 is positioned in air conduit 14 adjacent the precombustion chamber 13. The pressure tap senses the pressure in conduit 14 and transmits a signal to pressure controller 17 via pressure transmitter 18. Pressure controller 17 is operatively connected to valve 19 in reactor effluent conduit 21 so as to control the pressure in reactor 10 in accordance with a desired set point on controller 17.

Pressure indicator 22 indicates the pressure in conduit 21 at the pressure tap 23. Although pressure tap 23 tends to become clogged with carbon it is useful for calibrating the pressure at pressure tap 16. Pressure tap 23 should be cleaned prior to use each time it is to be used.

A preferred method for sensing the static pressure in the reactor is shown in FIGURE 2. The air inlet conduit of FIGURE 1 is modified by insertion of an orifice plate 24 having secured thereto a sleeve 25 so as to provide an annulus 26 which is in open communication with the interior of the reactor but is not occupied by a flowing stream. The pressure tap 16a is positioned in air inlet conduit 14a so as to be in communication with the annulus 26. The modification of FIGURE 2 avoids errors which can be introduced by velocity or dynamic pressure or by variations in pressure due to turbulence in the flowing air stream.

Although the invention has been described and illustrated as applied to a reactor of the precombustion type, it is applicable to any type of furnace carbon black reactor which has a fluid inlet into the reactor.

That which is claimed is:
1. In the method of controlling the static pressure in a furnace carbon black reactor having a reactant feed inlet conduit, an air inlet conduit, a reaction product effluent conduit, a valve in said effluent conduit, a conduit smaller than said air inlet conduit positioned in said air inlet conduit proximate the junction of the air inlet conduit and the furnace with the annulus between the conduits being sealed at its upstream end by an orifice plate so that there is a zone of minimum fluid flow and fluid turbulence in said annulus, the improvement comprising sensing the static pressure in said air inlet conduit in said annulus at a point adjacent said reactor and operating said valve responsive to the sensed pressure in said air inlet conduit so as to maintain a desired pressure in said reactor.

2. In a carbon black reactor having a reactant feed inlet conduit, an air inlet conduit, a reaction product effluent conduit and a valve in said effluent conduit, the combination therewith of: an orifice plate positioned in said air inlet conduit adjacent and spaced from said reactor; a sleeve, open at each end and secured to said orifice plate at one end and extending toward said reactor so as to provide an annulus in direct open communication with the interior of said reactor; means for sensing the pressure in said annulus; a pressure controller operatively connected to said valve in the effluent conduit and responsively connected to the pressure sensing means.

References Cited

UNITED STATES PATENTS

| 2,420,999 | 5/1947 | Ayers | 23—259.5 |
| 2,564,700 | 8/1951 | Krejci | 23—209.4 |
| 3,264,065 | 8/1966 | Schirmer et al. | 23—209.6 |

EDWARD J. MEROS, Primary Examiner

U.S. Cl. X.R.

23—209.6, 259.5